(12) United States Patent
Joseph et al.

(10) Patent No.: US 11,603,807 B2
(45) Date of Patent: Mar. 14, 2023

(54) CAMSHAFT TOOTHED WHEEL FOR A 3-, 4- OR 6-CYLINDER ENGINE WITH VARIABLE VALVE TIMING

(71) Applicant: Vitesco Technologies GmbH, Regensburg (DE)

(72) Inventors: Fabien Joseph, Toulouse (FR); Stéphane Eloy, Toulouse (FR)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 17/619,004

(22) PCT Filed: Jul. 2, 2020

(86) PCT No.: PCT/EP2020/068736
§ 371 (c)(1),
(2) Date: Dec. 14, 2021

(87) PCT Pub. No.: WO2021/004904
PCT Pub. Date: Jan. 14, 2021

(65) Prior Publication Data
US 2022/0268219 A1     Aug. 25, 2022

(30) Foreign Application Priority Data
Jul. 8, 2019   (FR) ...................................... 1907616

(51) Int. Cl.
*F02D 41/00* (2006.01)
*F01L 1/047* (2006.01)
(Continued)

(52) U.S. Cl.
CPC ............ *F02D 41/009* (2013.01); *F01L 1/047* (2013.01); *F01L 1/34* (2013.01); *F02D 13/0219* (2013.01); *F01L 2820/041* (2013.01)

(58) Field of Classification Search
CPC .... F02D 13/0219; F02D 41/009; F01L 1/047; F01L 1/34; F01L 2820/041;
(Continued)

(56) References Cited

U.S. PATENT DOCUMENTS 6,474,278 B1   11/2002 Davis et al.
2003/0037607 A1*  2/2003 Minich ................. G01M 15/06
                                                73/114.25
(Continued)

FOREIGN PATENT DOCUMENTS

DE      10030486 A1 *  1/2001  .......... F02D 41/009
EP      0055641 A2 *   7/1982  ............... F02P 5/04
JP      01100350 A     4/1989

OTHER PUBLICATIONS

English Translation of the Written Opinion for International Application No. PCT/EP2020/068736, dated Sep. 14, 2020, 4 pages.
(Continued)

*Primary Examiner* — Devon C Kramer
*Assistant Examiner* — Wesley G Harris
(74) *Attorney, Agent, or Firm* — RatnerPrestia

(57) ABSTRACT

A camshaft toothed wheel, forming a target for a camshaft rotation sensor, including a plurality of teeth distributed over its circumference. The toothed wheel including a first set of four teeth each spaced apart by 90°, and a second set of six teeth each spaced apart by 60°. The teeth of each set being distributed such that the wheel includes two portions of its circumference without an active edge of teeth over an angle of at least 35° and which are spaced apart by 180°. The teeth of the first set of teeth and of the second set of teeth being arranged such that no tooth is common to the first set of teeth and to the second set of teeth.

10 Claims, 4 Drawing Sheets

(51) Int. Cl.
*F01L 1/34* (2006.01)
*F02D 13/02* (2006.01)

(58) Field of Classification Search
CPC ........... F01L 2303/00; F01L 1/46; F01L 9/20;
Y02T 10/40; G01D 5/145; G01D
5/24476; G01D 5/2451; G01R 33/072
USPC ..................... 123/90.11; 73/114.26; 701/105
See application file for complete search history.

(56) References Cited

U.S. PATENT DOCUMENTS

2004/0094130 A1* 5/2004 Lingener ............... F02D 41/009
123/478
2014/0360254 A1 12/2014 Deringer et al.

OTHER PUBLICATIONS

International Search Report and Written Opinion for International Application No. PCT/EP2020/068736, dated Sep. 14, 2020, with partial English translation, 7 pages.
International Search Report and Written Opinion for International Application No. PCT/EP2020/068736, dated Sep. 14, 2020, 12 pages (French).

* cited by examiner

US 11,603,807 B2

CAMSHAFT TOOTHED WHEEL FOR A 3-, 4- OR 6-CYLINDER ENGINE WITH VARIABLE VALVE TIMING

CROSS REFERENCE TO RELATED APPLICATIONS

This application is the U.S. National Phase Application of PCT International Application No. PCT/EP2020/068736, filed Jul. 2, 2020, which claims priority to French Patent Application No. 1907616, filed Jul. 8, 2019, the contents of such applications being incorporated by reference herein.

FIELD OF THE INVENTION

The invention relates to a camshaft toothed wheel forming a target for a camshaft angular position sensor, for three-, four- or six-cylinder engines. The invention applies in particular to engines of the variable valve timing type.

BACKGROUND OF THE INVENTION

In the operating cycle of an internal combustion engine, it is necessary to know the position of the crankshaft accurately in order to be able to synchronize different actions such as fuel injection, spark plug control, management of timing members, etc. This makes it possible to optimize the efficiency of the combustion and to reduce fuel consumption and harmful emissions.

To this end, a crankshaft conventionally includes a toothed wheel the teeth of which are detected by a sensor. The toothed wheel typically comprises a set of teeth distributed regularly along its circumference, with the exception of a reference portion without teeth, also known as a "gap". By detecting the teeth passing in front of the sensor and counting the number of teeth that have passed since the "gap", it is possible to know the position of the crankshaft over a 360° turn.

Now, one engine cycle corresponds to two complete rotations of the crankshaft, and it is therefore insufficient to determine the position of the engine solely on the basis of the crankshaft wheel.

This information is therefore combined with information about the angular position of the camshaft, which is rotated by the crankshaft and also includes a toothed wheel the teeth of which are detected by a corresponding sensor.

Whereas an engine cycle corresponds to two 360° rotations of the crankshaft, it only corresponds to one 360° rotation of the camshaft. As a result, the camshaft toothed wheel has a rotational asymmetry that, cross-referenced with the information about the position of the crankshaft, makes it possible to deduce the state of the engine cycle accurately.

Each time the engine is started, the engine is thus synchronized when the crankshaft "gap" is detected, combined with the detection of the state of the camshaft wheel.

With reference to FIG. 1, in the case of an engine with variable valve timing (VVT), provision can be made to offset the angular position of the intake camshaft and/or the exhaust camshaft relative to the crankshaft to cause exhaust gas recirculation in the cylinders, in order to reduce fuel consumption and emissions. In FIG. 1, the x axis shows the angular position of the crankshaft in degrees (an angle of rotation of the crankshaft corresponding to double the corresponding rotation of the camshaft) and the y axis shows the displacement of the intake or exhaust valve in millimeters. The solid lines show the displacements of the intake (curve A) and exhaust (curve B) valves controlled respectively by the intake and exhaust camshafts by default, and the dashed lines show the offset of the angular position of the camshafts (curve A' for the intake valves and B' for the exhaust valves) to allow the existence of an overlap range between the opening phases of the intake and exhaust valves.

In order to improve the performance of the control of the variable valve timing, it is known practice to position teeth forming markers specific to each cylinder on the camshaft toothed wheel. For example, a camshaft toothed wheel of a four-cylinder engine can include four active edges each spaced apart by 90°, each active edge passing the sensor corresponding to the same position of the piston in each respective cylinder.

Now, since the number of cylinders in an engine is variable depending on the configuration of the engine, there results a wide variety of the camshaft toothed wheels, including for the same motor vehicle manufacturer, which increases the production cost of these wheels.

Document US2014/360254, incorporated herein by reference, discloses a camshaft toothed wheel which comprises at least one tooth at each of the following positions of its circumference: 0°, 60°, 90°, 120°, 180°, 240°, 270° and 300°.

This makes it possible to obtain a single wheel that is simultaneously compatible with four-cylinder engines (as the information corresponding to each cylinder is supplied by teeth 0°, 90°, 180° and 270°) and with three- and six-cylinder engines (information supplied by teeth 0° CAM, 60° CAM, 120° CAM, 180° CAM, 240° CAM, 300° CAM).

However, a camshaft toothed wheel comprising only these teeth is not functional, since it does not have rotational asymmetry and therefore does not make it possible, by combining its position with that of the crankshaft, to deduce the position in the engine cycle therefrom. To overcome this disadvantage, and also to reduce the synchronization time, this document makes provision to add a certain number of additional teeth in other configurations of wheels.

Now, the addition of an excessively large number of teeth degrades the synchronization performance by increasing the quantity of data to be processed from the position sensor of the toothed wheel.

Moreover, if the toothed wheel of the camshaft has an excessively large number of teeth, there is a risk of nonsynchronization during a phase shift of a camshaft, since the signal detected by the position sensor of the camshaft during the detection of the "gap" of the crankshaft can be different from the signal detected in the absence of a phase shift.

SUMMARY OF THE INVENTION

Taking the foregoing into account, an aim of the invention is to propose a toothed wheel for a camshaft that is compatible with variable valve timing engines comprising three, four or six cylinders.

Another aim of the invention is to propose improved synchronization performance.

Another aim of the invention is to reduce the quantity of processing necessary on the signals emitted by a position sensor of the toothed wheel to carry out the synchronization.

In this regard, one subject of the invention is a camshaft toothed wheel, forming a target for a camshaft rotation sensor, comprising a plurality of teeth distributed over its circumference, the toothed wheel comprising a first set of four teeth each spaced apart by 90°, and a second set of six teeth each spaced apart by 60°, the teeth of each set being distributed such that the wheel comprises at least two portions of its circumference without an active edge of teeth over an angle of at least 35° and which are spaced apart by 180°, characterized in that the teeth of the first set of teeth and of the second set of teeth are arranged such that no tooth is common to the first set of teeth and to the second set of teeth.

Advantageously, each tooth of the first set of teeth is offset from a tooth of the second set by an angle of between 10 and 20°.

In one embodiment, the toothed wheel comprises two first said portions without an active edge of teeth over an angle of at least 35° and which are spaced apart from one another by 180°.

Advantageously, the toothed wheel further comprises two second said portions without an active edge of teeth over an angle of at least 35° and which are spaced apart from one another by 180°, and alternated with the two said first portions.

Advantageously, the toothed wheel further comprises at least one additional tooth forming a marker for the synchronization of the angular position of the camshaft with an angular position of the crankshaft.

In some embodiments, each tooth forms a rising edge and a falling edge, and two consecutive falling active edges or two consecutive rising active edges of teeth are spaced apart by at least 10°.

In one embodiment, a first tooth of the second set is spaced apart from a first tooth of the first set by 15°, and the wheel further comprises at least two additional synchronization teeth respectively spaced apart from the first tooth of the first set by 120 and 240°.

An aspect of the invention also relates to a camshaft, comprising a toothed wheel according to the description above.

Another subject of the invention is a three-, four- or six-cylinder internal combustion engine, comprising at least one camshaft comprising a toothed wheel according to the description above.

Advantageously, the internal combustion engine has variable valve timing and further comprises:
  a crankshaft, comprising a toothed wheel comprising a set of teeth regularly distributed over the circumference of the wheel and a reference space without teeth,
  an angular position sensor of the crankshaft, suitable for detecting the presence of a tooth of the toothed wheel of the crankshaft,
  an angular position sensor of the camshaft, suitable for detecting the presence of a tooth of the toothed wheel of the camshaft, and
  a processing unit, suitable for receiving the position signals from the angular position sensor of the camshaft and from the angular position sensor of the crankshaft and for deducing a state of the engine cycle therefrom,
  wherein the toothed wheel of the camshaft is positioned such that the range of angular positions of the crankshaft in which the reference space without teeth of the toothed wheel of the crankshaft is opposite the angular position sensor of the crankshaft is included in the range of angular positions of the crankshaft in which a portion of at least 35° without an active edge of teeth of the camshaft toothed wheel is opposite the angular position sensor of the camshaft.

In one embodiment, the engine comprises an intake camshaft and an exhaust camshaft, each comprising a toothed wheel according to the description above, the engine further comprising an angular position sensor of each of the intake camshaft and of the exhaust camshaft, and the toothed wheel of the intake camshaft and the toothed wheel of the exhaust camshaft are positioned such that the range of angular positions of the crankshaft during which the reference space without teeth of the toothed wheel of the crankshaft is opposite the angular position sensor of the crankshaft is:
  included in a range of angular positions of the crankshaft in which a portion without an active edge of teeth of the intake camshaft toothed wheel is opposite the corresponding angular position sensor, said range of angular positions extending by at least an additional 10° in the clockwise direction, that is to say an extension of 45°=35°+10°, and
  included in a range of angular positions of the crankshaft during which a portion without an active edge of teeth of the exhaust camshaft toothed wheel is opposite the corresponding angular position sensor, said range of angular positions extending by at least an additional 10° in the counterclockwise direction, that is to say an extension of 45°=35°+10°.

The camshaft toothed wheel according to an aspect of the invention comprises a first set of teeth spaced apart by 90°, which makes it compatible with four-cylinder engines. The second set of teeth spaced apart by 60° also makes it compatible with six-cylinder engines. The presence of two symmetrical portions without an active edge of teeth and with an angular range of at least 35° makes it possible to ensure that even in the case of a phase shift of the camshaft for a variable valve timing engine, the active edge used to control the VVT is not situated in a "gap" zone. Specifically, the toothed wheel according to an aspect of the invention can be used in a variable valve timing engine by positioning the portion without teeth relative to the crankshaft wheel "gap" so that, even if the camshaft is offset, the crankshaft wheel "gap" always coincides with the portion without teeth. With the engine position being based on the analysis of the crankshaft edges, the "gap" zone generates greater inaccuracy.

Moreover, the offset between the teeth of the first set and the teeth of the second set makes it possible to ensure the rotational asymmetry of the wheel without adding additional teeth, and therefore allows the state of the engine cycle to be determined by combining the angular position information of this wheel with that of the crankshaft.

To reduce the synchronization time, it is possible to add one or two additional teeth respectively spaced apart by 150 and 240° from the first tooth of the first group.

BRIEF DESCRIPTION OF THE DRAWINGS

Other features and advantages of aspects of the invention will become more clearly apparent on reading the following description. This description is purely illustrative and must be read with reference to the appended drawings, in which.

DETAILED DESCRIPTION OF THE PREFERRED EMBODIMENTS

Hereinafter, angles measured in degrees on or relating to an angular position of a camshaft toothed wheel will be denoted as "° CAM", and angles measured in degrees on or relating to an angular position of a crankshaft toothed wheel will be denoted as "° CRK". A rotation of 1° CAM corresponds to a rotation of 2° CRK.

Figure 2:
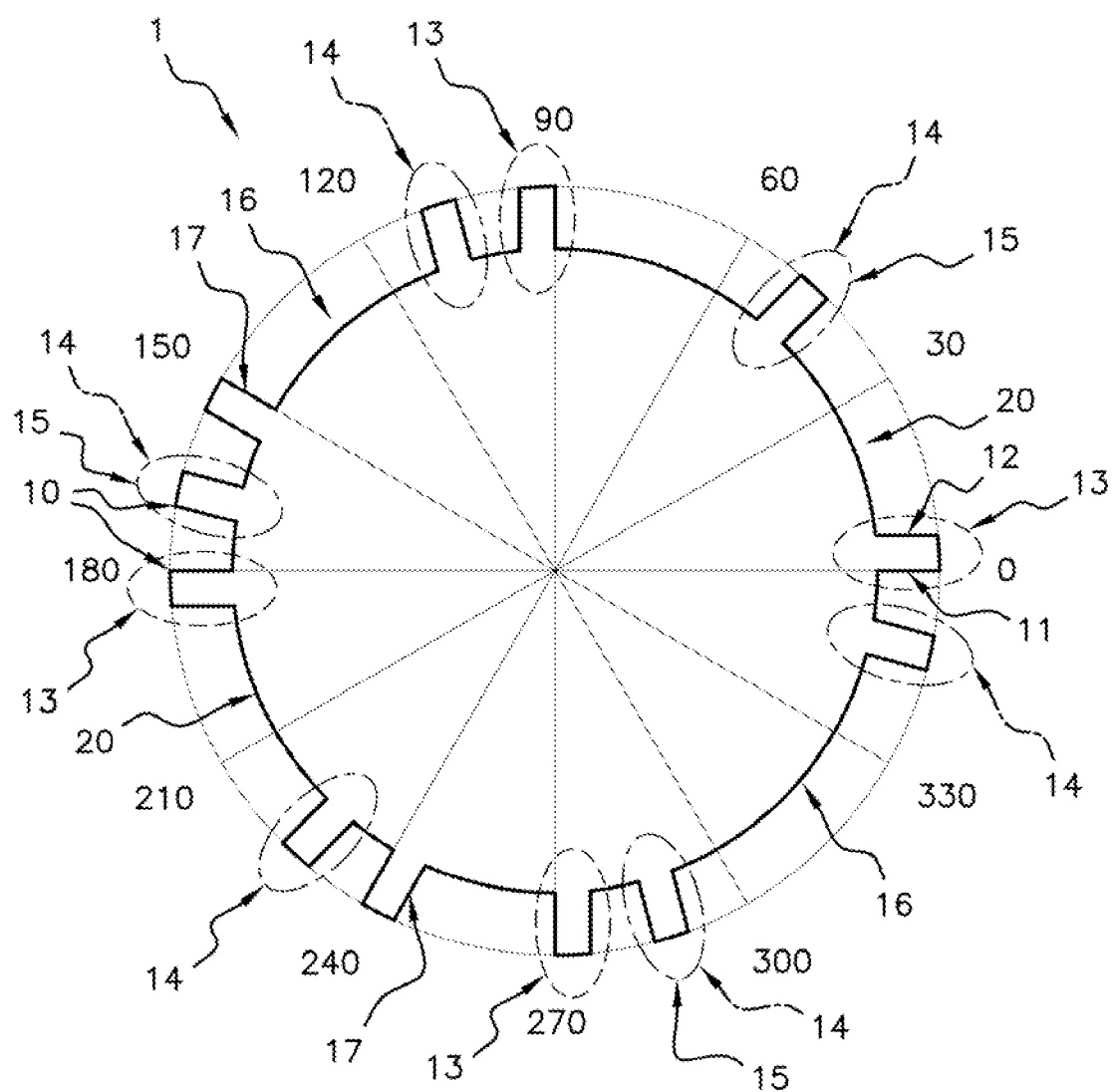
FIG. 2 shows an example of a camshaft toothed wheel according to one embodiment of the invention.

With reference to FIG. 2, a camshaft toothed wheel 1 will now be described that forms a target for a sensor 2 making it possible to determine the angular position of the camshaft.

The toothed wheel 1 has the general shape of a disk having a plurality of teeth 10 on its circumference, each tooth having a rectangular general shape and successively forming, when it passes in front of a sensor 2, a rising edge 11 and a falling edge 12. In order to allow good detection performance, two consecutive rising edges or two consecutive falling edges are advantageously distant by at least 10° CAM, and a top or bottom level must have an angular opening of at least 5° CAM. By top level is meant the top part of a tooth which separates its rising edge from its falling edge, and by bottom level is meant the part of the toothed wheel 1 which separates a falling edge from a rising edge of two successive teeth.

The sensor 2 comprises a detection cell (for example of the Hall-effect cell type, magneto-resistive cell type, etc.) which is suitable for accurately detecting either the rising edge or the falling edge of a tooth. The edge detected among the rising edge and the falling edge is referred to as the active edge.

The toothed wheel includes a first set of teeth 13 comprising four teeth each spaced apart by 90° CAM. In other words, the angular offset between two rising edges or two falling edges of this set is 90° CAM. Owing to the spacings between the teeth, the teeth of this first set 13 form references for four cylinders of a four-cylinder engine. For example, the toothed wheel 1 can be advantageously positioned on the camshaft of an engine such that the detection of a tooth of this set corresponds to the top dead center of a piston of a respective cylinder of the engine.

The toothed wheel further includes a second set of teeth 14 comprising six teeth each spaced apart by 60° CAM. In other words, this angular offset of 60° CAM applies between two rising edges and two falling edges of this set 14 of teeth. Owing to this spacing of 60° CAM between the teeth of this set 14, each tooth of this set forms a reference for a respective cylinder of a six-cylinder engine. Simultaneously, this set 14 comprises a subset 15 of three teeth which are spaced apart by 120° CAM, and which therefore form references for the cylinders of a three-cylinder engine.

Thus, these two sets 13, 14 and this subset 15 of teeth make it possible for the toothed wheel 1 to be compatible with 3-, 4- or 6-cylinder engines.

To be compatible with a variable valve timing (VVT) engine, the toothed wheel 1 also has two first portions 16 without an active edge of teeth over an angular range of at least 35° CAM, for example equal to 45° CAM (which corresponds to an angle of 90° CRK for the crankshaft), the two first portions 16 being spaced apart by 180° CAM. The first portions 16 can respectively cover an angular opening wider than 35° CAM, and in this case they must at least comprise portions of 35° CAM spaced apart by 180° CAM.

As described in more detail below, and with reference to FIG. 3, during the installation of the toothed wheel on the camshaft, each first portion 16 without an active edge of teeth is positioned at an angular position where it is detected simultaneously to the detection of a "gap" of a crankshaft wheel by the corresponding sensor.

Figure 3:
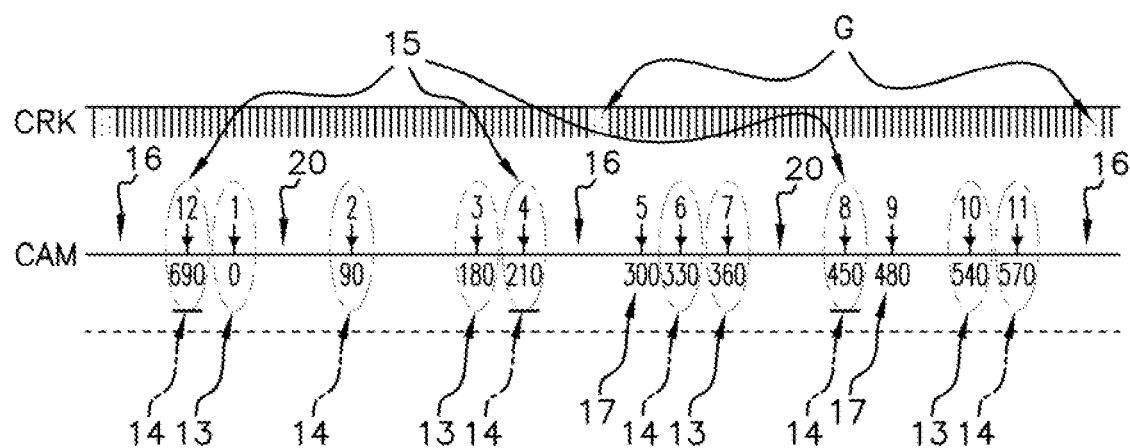
FIG. 3 shows an example of synchronization of a toothed wheel according to FIG. 2 with a toothed wheel of the camshaft according to one embodiment of the invention.

FIG. 3 compares the teeth of a crankshaft wheel (top line—CRK) including two "gap" zones G (without teeth) and the teeth of a camshaft toothed wheel (bottom line—CAM, each figure indicated by an arrow representing an angle of rotation value of the crankshaft in ° CRK, the angle of rotation value of the camshaft in ° CAM being equal to half of the value given). The toothed wheel 1 of the camshaft is therefore positioned such that the "gap" zone(s) of the crankshaft correspond(s) to the first portions 16 without an active edge of teeth of the toothed wheel of the camshaft.

The amplitude of 35° CAM or more of a first portion 16 makes it possible, even if the camshaft is angularly offset to modify the angular opening zones of the intake or exhaust valves, for the zone of the toothed wheel 1 detected by the sensor 2 simultaneously with the detection of the crankshaft "gap" to always be without an active edge of teeth. Thus, the risk of inaccurate marking linked to the detection of a tooth simultaneously with the presence of the crankshaft "gap" is avoided.

The presence of two first portions 16 spaced apart by 180° CAM results from the fact that one rotation of the camshaft corresponds to two rotations of the crankshaft and therefore the crankshaft "gap" corresponds to two portions of the toothed wheel spaced apart by 180° CAM.

Advantageously, the toothed wheel 1 can comprise, in addition to the two first portions 16, two second portions 20 without an active edge of teeth over at least 35° CAM and which are spaced apart from one another by 180°, and alternated with the two first portions 16. The first 16 and second 20 portions are thus each spaced apart by 90° CAM. This allows the toothed wheel 1 to be used with a crankshaft wheel comprising two "gap" zones, for better synchronization.

Moreover, the teeth of the first set 13 and of the second set 14 are positioned such that there is always a spacing of at least 10° CAM between a tooth of the first set and a tooth of the second set, in such a way that no tooth is common between the two sets. Preferably, each tooth of the first set is offset from a tooth of the second set by an angle of between 10 and 20° CAM.

For example, on the wheel shown in FIG. 2, by fixing the reference of 0° horizontally to the right of the center of the wheel, the rising edges of the teeth of the first set 13 are positioned at the following angles (in ° CAM): 0°, 90°, 180°, 270°.

The rising edges of the teeth of the second set 14 are positioned at the following angles: 45°, 105°, 165°, 225°, 285° and 345°. This configuration is also visible in FIG. 3, where each arrow represents a tooth.

Thus, in this example, each tooth of the first set is distant by 15° from a tooth of the second set.

In order to ensure that no tooth is common between the first 13 and the second 14 set, it is possible to position a first tooth of the second set 14 so as to be offset from a first tooth of the first set 13, taken for example as reference to an angle of 0°, by an angle of between 10 and 20° CAM, and then to position each of the teeth by reference to the first tooth of its respective set.

This configuration makes it possible to obtain a rotational asymmetry at 360° CAM of the toothed wheel 1, that is to say the profile of the teeth of any toothed wheel half is different from that of the other half, and therefore makes it possible to determine, jointly with angular position data of the crankshaft, the state of the engine cycle.

Advantageously, the toothed wheel 1 can comprise one or more additional teeth 17 forming additional markers to improve the synchronization time of the engine, that is to say the time elapsed since the initialization of the rotation of the engine shaft, and on the basis of which the state of the engine cycle is determined.

The additional tooth or teeth 17 is or are separate from the teeth of the sets 13 and 14 and also positioned outside the portions 16 and 20, where appropriate without an active edge of teeth.

By adopting the nonlimiting example of FIG. 2 described above, the toothed wheel can comprise additional teeth 17 whose rising edges are positioned respectively at 150° CAM and 240° CAM.

The positioning of the additional teeth 17 is determined so as to create a rotational asymmetry at 180° CAM and 90° CAM: this means that if the target is cut into 2 equal parts, or into 4 equal parts, the parts will not be identical.

Moreover, the number of additional teeth 17 advantageously does not exceed five teeth, and more advantageously does not exceed three teeth, in order not to excessively increase the processing time associated with the acquisition of the signals representative of the teeth passing by the sensor 2.

Figure 4:
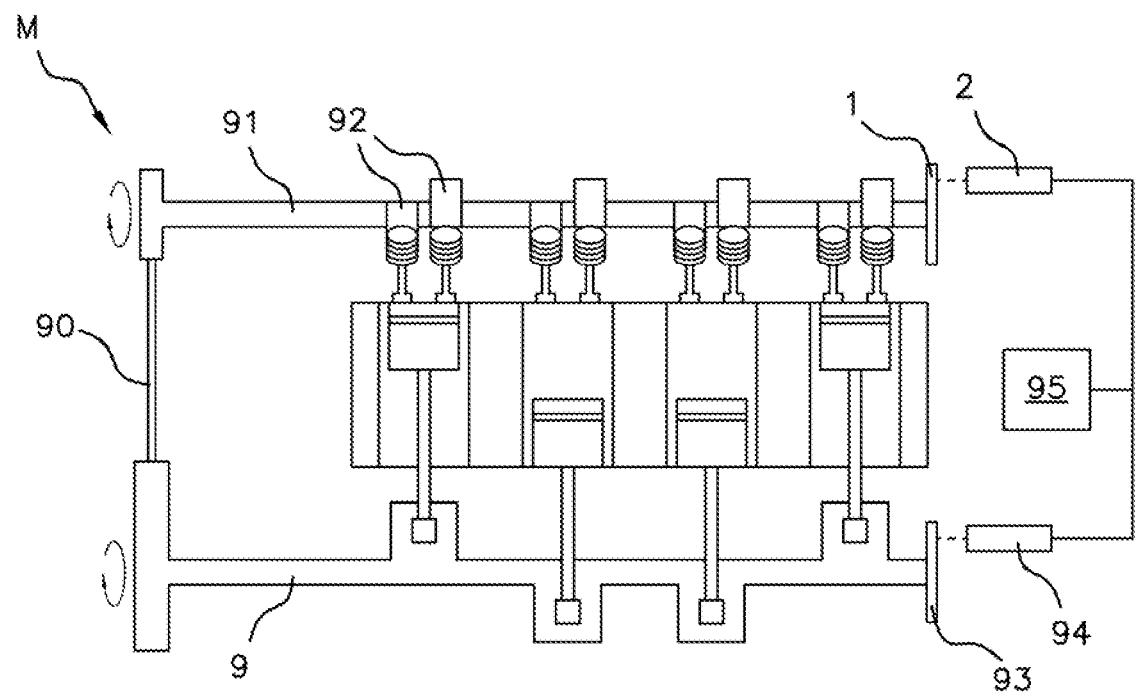
FIG. 4 shows an example of an engine comprising a camshaft toothed wheel according to one embodiment of the invention.

FIG. 4 is a schematic representation of an example of a variable valve timing internal combustion engine comprising a toothed wheel according to the description above.

The engine M comprises a crankshaft 9 which rotates, by means of a timing belt 90, at least one camshaft 91, the rotation of which successively causes the intake and exhaust valves 92 to open and close. With the engine having variable valve timing, it can further comprise means (not shown) for angularly offsetting the camshaft to modify the opening times of the valves relative to an identical position of the crankshaft. The maximum offset angle is of the order of 25° CAM (that is to say 50° CRK).

In one case (not shown), the engine can comprise an intake camshaft 91, controlling the opening and closing of the intake valves, and an exhaust camshaft 92, controlling the opening and closing of the exhaust valves.

The crankshaft 9 includes a toothed wheel 93 comprising a set of teeth regularly distributed around its circumference, typically 36 or 60 teeth, with the exception of one or two "gap" zones, typically with one or two missing teeth. The example given in FIGS. 3 and 5 corresponds to 60 teeth with two "gap" zones of two missing teeth each.

A crankshaft angular position sensor 94 is positioned opposite the toothed wheel 93 and is suitable for detecting the passage of each tooth of the wheel.

A toothed wheel 1 is mounted on the camshaft 91 or on each camshaft. A sensor 2 is positioned in front of the toothed wheel and is suitable for detecting the passage of each tooth of the wheel by detecting the rising edge or the falling edge.

The engine also comprises a central processing unit 95 suitable for receiving the detection signals from the angular position sensors of the crankshaft and the camshaft, and for deducing a state of the engine cycle therefrom at all times.

As indicated above with reference to FIG. 3, the toothed wheel of the camshaft is positioned so that the range of the engine cycle during which the reference space without teeth of the crankshaft toothed wheel is opposite the crankshaft angular position sensor 94 is included in the range of the engine cycle during which a portion of at least 35° CAM without an active edge of teeth of the camshaft toothed wheel is opposite the camshaft angular position sensor 2.

Figure 1:
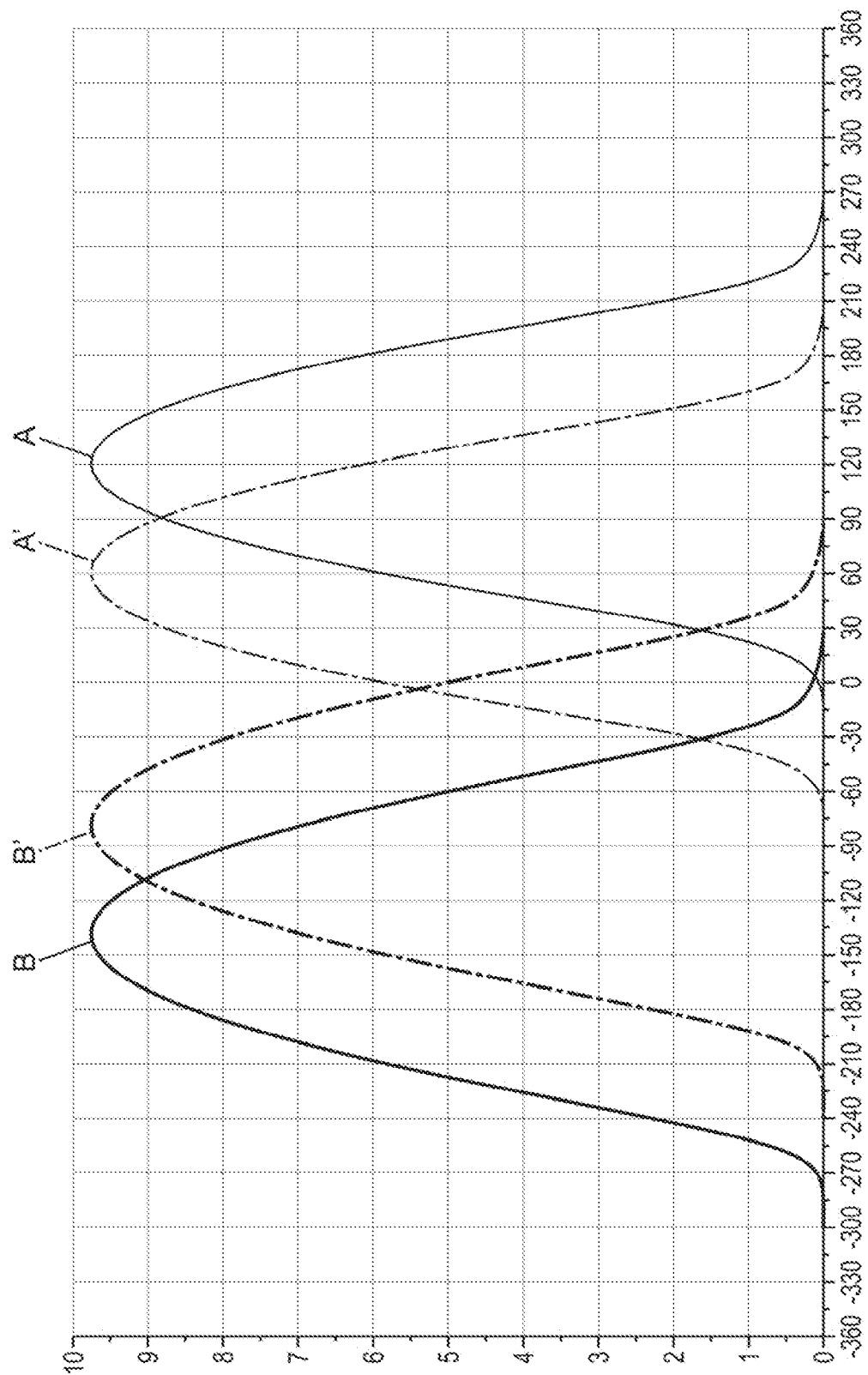
FIG. 1, described above, shows the displacement of the intake and exhaust valves as a function of the angular position of the camshaft to which they are connected.

More advantageously, if the engine comprises two camshafts, as visible in FIG. 1, the offsetting of the intake camshaft and that of the exhaust camshaft are done in opposite directions to bring the common opening angular ranges of the exhaust valves closer together.

The toothed wheels 1 corresponding to each camshaft are then advantageously positioned in such a way that, over the whole angular offsetting range of each camshaft, the detection of the "gap" by the angular position sensor of the crankshaft corresponds to a detection of the portions 16, 20 without an active edge of teeth of the two toothed wheels respectively of the intake camshaft and the exhaust camshaft.

Figure 5:
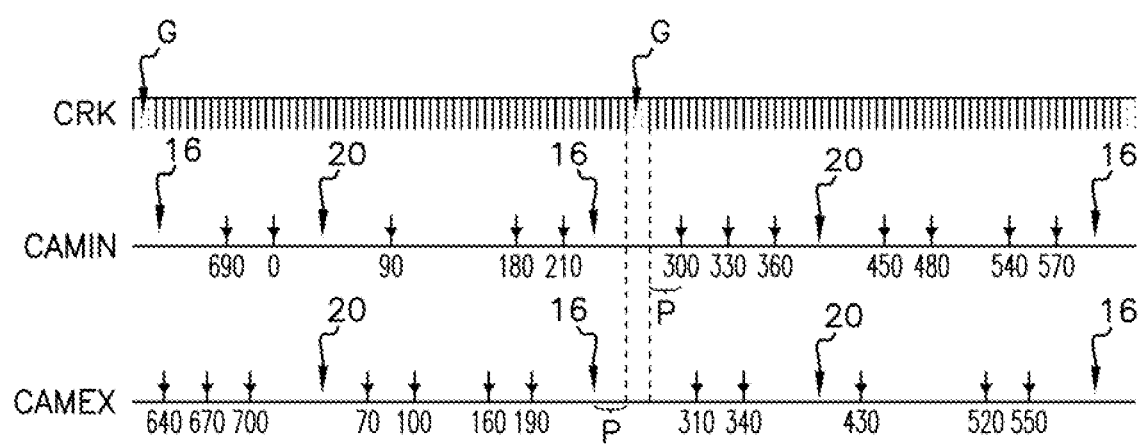
FIG. 5 shows an example of positioning of an intake camshaft toothed wheel and an exhaust camshaft toothed wheel relative to a crankshaft toothed wheel.

FIG. 5 is a schematic illustration of the toothed wheel of the crankshaft (CRK) and a toothed wheel 1 according to FIGS. 2 and 3 for each of the exhaust camshaft (CAMEX) and of the intake camshaft (CAMIN). The camshaft toothed wheels have two first portions 16 and two second portions 20 without an active edge of teeth, with an angular amplitude of at least 35° CAM each. The indications of degrees appearing on the lines CAMIN and CAMEX of FIG. 5 correspond to degrees of crankshaft rotation (° CRK).

In a default angular position (that is to say without offsetting for the variable valve timing) of the intake camshaft, the toothed wheel 1 of the intake camshaft is positioned such that the range of angular positions of the crankshaft in which the "gap" zone is opposite the corresponding sensor is included in the range of angular positions of the crankshaft in which a portion 16 without an active edge of teeth of the toothed wheel of this shaft is opposite the corresponding sensor, this range P extending over at least an additional 30° CRK in the clockwise direction with respect to the range of detection of the "gap" zone. This additional range is illustrated in FIG. 5 by a brace, the 30° CRK being taken with respect to the rotation of the crankshaft, which are equivalent to 15° CAM of rotation of the camshaft.

Since the offsetting of the intake camshaft is carried out in the counterclockwise direction, the "gap" zone therefore always corresponds to the portion without an active edge of teeth of the toothed wheel of the exhaust camshaft, to the direction of the detection by the sensors.

By contrast, since the offsetting of the exhaust camshaft is carried out in the clockwise direction, the toothed wheel 1 of the exhaust camshaft is positioned such that the range of angular positions of the crankshaft in which the "gap" zone is opposite the corresponding sensor is included in the range of angular positions of the crankshaft during which the portion 16 without an active edge of teeth of the toothed wheel of this shaft is opposite the corresponding sensor, this range P extending over at least an additional 30° CRK (of rotation of the crankshaft, which are equivalent to 15° CAM of rotation for the camshaft) in the counterclockwise direction.

The synchronization performance for an engine equipped with the toothed wheel described above is increased, since an average synchronization is obtained after a rotation of less than 410° CRK for a crankshaft toothed wheel comprising only one "gap", and of less than 230° CRK for a crankshaft toothed wheel comprising two "gaps".

The invention claimed is:
1. A toothed wheel of a camshaft, forming a target for a camshaft rotation sensor, comprising a plurality of teeth distributed over a circumference of the toothed wheel;

the plurality of teeth comprising:
a first set of four teeth each spaced apart from one another by 90°, and
a second set of six teeth each spaced apart from one another by 60°,
the teeth of each set being distributed such that the wheel further comprises at least two portions of its circumference without an active edge of teeth over an angle of at least 35° and which are spaced apart by 180°, wherein the teeth of the first set of teeth and of the second set of teeth are arranged such that no tooth is common to the first set of teeth and to the second set of teeth.

2. The toothed wheel as claimed in claim 1, wherein each tooth of the first set of teeth is offset from a tooth of the second set of teeth by an angle of between 10 and 20°.

3. The toothed wheel as claimed in claim 1, comprising two first portions of said at least two portions without an active edge of teeth over an angle of at least 35° and which are spaced apart from one another by 180°.

4. The toothed wheel as claimed in claim 3, further comprising two second portions of said at least two portions without an active edge of teeth over an angle of at least 35° and which are spaced apart from one another by 180°, and alternated with the two said first portions.

5. The toothed wheel as claimed in claim 1, further comprising at least one additional tooth of the plurality of teeth forming a marker for a synchronization of an angular position of the camshaft with an angular position of a crankshaft.

6. The toothed wheel as claimed in claim 1, each tooth of the plurality of teeth forming a rising edge and a falling edge, and wherein two consecutive falling active edges or two consecutive rising active edges of teeth are spaced apart by at least 10°.

7. A camshaft, comprising the toothed wheel as claimed in claim 1.

8. A three-, four- or six-cylinder internal combustion engine, comprising at least one of the camshaft as claimed in claim 7.

9. A toothed wheel of a camshaft, forming a target for a camshaft rotation sensor, comprising a plurality of teeth distributed over a circumference of the toothed wheel;
the plurality of teeth comprising:
a first set of four teeth each spaced apart by 90°, and
a second set of six teeth each spaced apart by 60°,
the teeth of each set being distributed such that the wheel further comprises at least two portions of its circumference without an active edge of teeth over an angle of at least 35° and which are spaced apart by 180°, wherein the teeth of the first set of teeth and of the second set of teeth are arranged such that no tooth is common to the first set of teeth and to the second set of teeth,
wherein a first tooth of the second set is spaced apart from a first tooth of the first set by 15°, and the wheel further comprises at least two additional synchronization teeth respectively spaced apart from the first tooth of the first set by 150° and 240°.

10. A three-, four- or six-cylinder internal combustion engine comprising at least one camshaft, the camshaft comprising a toothed wheel forming a target, the toothed wheel comprising a plurality of teeth distributed over a circumference of the toothed wheel;
the plurality of teeth comprising:
a first set of four teeth each spaced apart by 90°, and
a second set of six teeth each spaced apart by 60°,
the teeth of each set being distributed such that the wheel further comprises at least two portions of its circumference without an active edge of teeth over an angle of at least 35° and which are spaced apart by 180°, wherein the teeth of the first set of teeth and of the second set of teeth are arranged such that no tooth is common to the first set of teeth and to the second set of teeth, the engine having variable valve timing and further comprising:
a crankshaft, comprising a toothed wheel comprising a set of teeth regularly distributed over a circumference of the toothed wheel of the crankshaft and a reference space without teeth,
an angular position sensor of the crankshaft, suitable for detecting a presence of a tooth of the toothed wheel of the crankshaft,
an angular position sensor of the camshaft, suitable for detecting a presence of a tooth of the plurality of teeth of the toothed wheel of the camshaft, and
a processing unit, suitable for receiving position signals from the angular position sensor of the camshaft and from the angular position sensor of the crankshaft and for deducing a state of an engine cycle therefrom,
wherein the toothed wheel of the camshaft is positioned such that a range of angular positions of the crankshaft in which the reference space without teeth of the toothed wheel of the crankshaft is opposite the angular position sensor of the crankshaft is included in the range of angular positions of the crankshaft in which a portion of at least 35° without an active edge of teeth of the toothed wheel of the camshaft is opposite the angular position sensor of the camshaft.

\* \* \* \* \*